United States Patent

[11] 3,607,993

[72] Inventor Malcolm H. Tuttle
 56 Avon Road, New Rochelle, N.Y. 10804
[21] Appl. No. 826,231
[22] Filed May 20, 1969
[23] Division of Ser. No. 531,658,
 Mar. 4, 1966, Pat. No. 3,461,489
[45] Patented Sept. 21, 1971

[54] METHOD OF PRILLING
 4 Claims, 14 Drawing Figs.
[52] U.S. Cl. .................................................. 264/8
[51] Int. Cl. .................................................. B01j 2/04
[50] Field of Search .................................... 264/8

[56] References Cited
 UNITED STATES PATENTS
3,246,982 4/1966 Moritz et al. ................ 264/8
3,272,893 9/1966 Mogensen ................... 264/8
3,329,746 7/1967 Joyce et al. .................. 264/8

Primary Examiner—Robert F. White
Assistant Examiner—J. R. Hall
Attorney—Ralph M. Watson ABSTRACT: Prills are formed from molten material by expelling hot melt through sets of orifices drilled through the outer wall of a rotating centrifugal distributor on spaced horizontal planes and along lines which are related to the tangent, at the point of discharge, to the circle described by the distributor as it rotates through angles which differ in magnitude progressively from the upper to the lower portions of the distributor so that jets of hot melt are discharged from the distributor along sets of lines respectively slanted toward the direction of rotation at the uppermost plane of discharge and toward the other direction at the next lower plane of discharge, and at related speeds.

INVENTOR.
MALCOLM H. TUTTLE

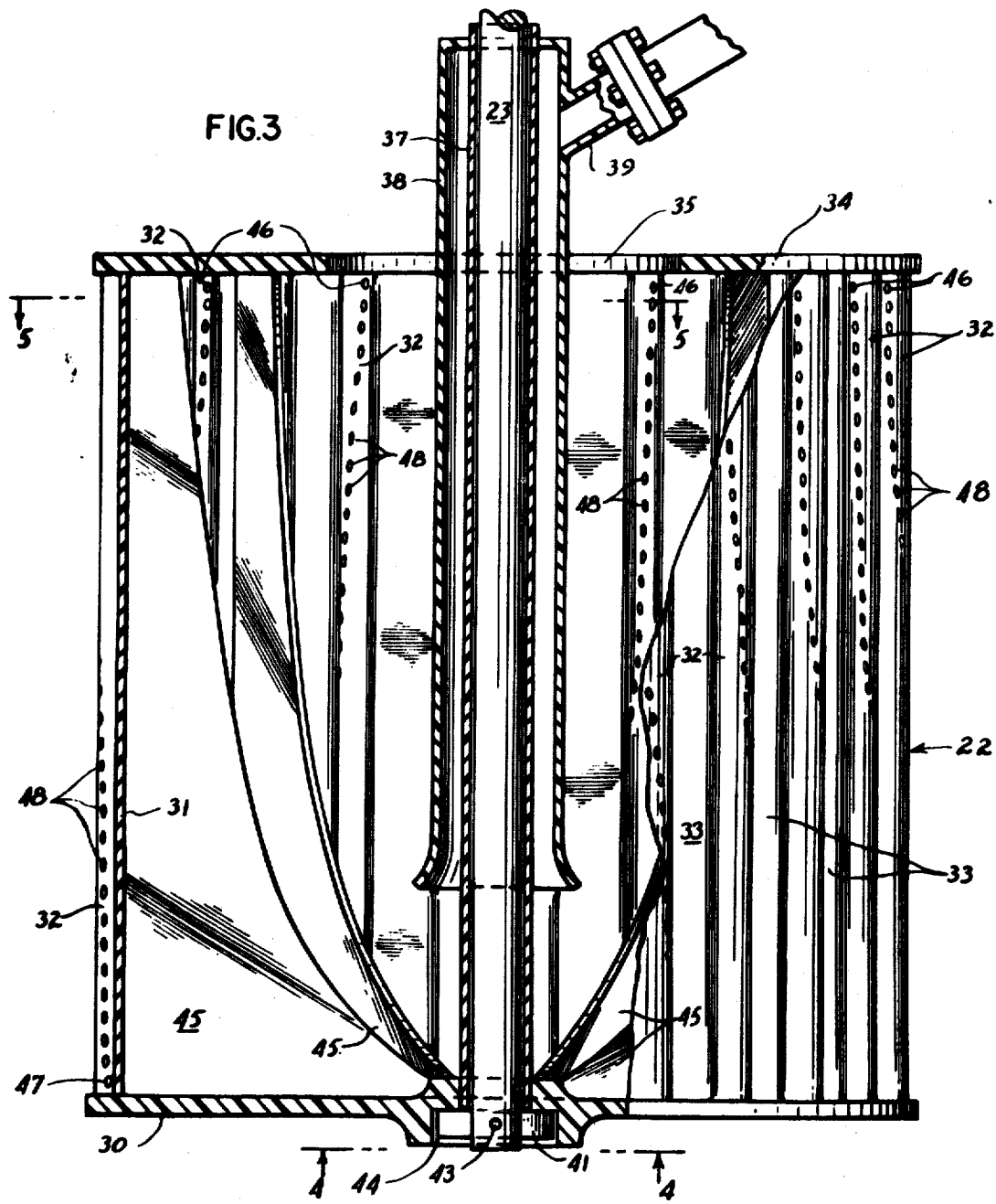

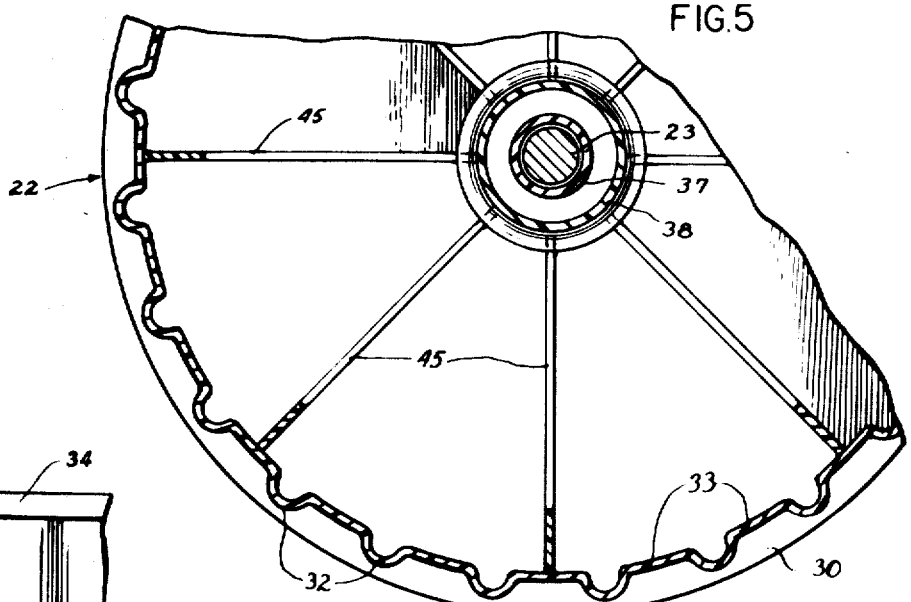
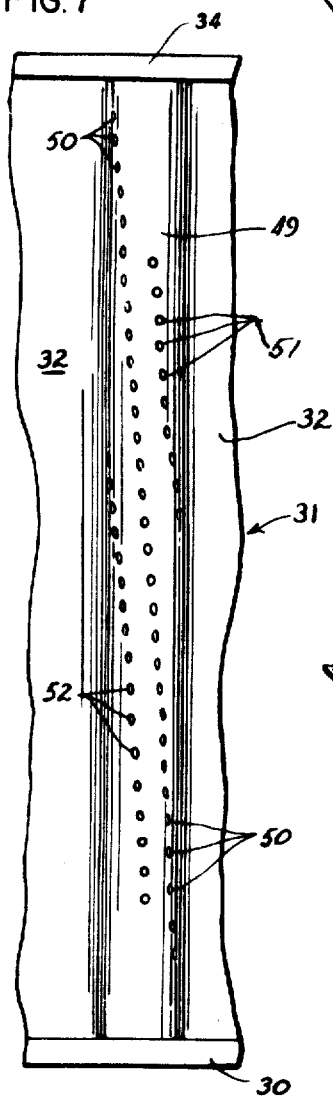
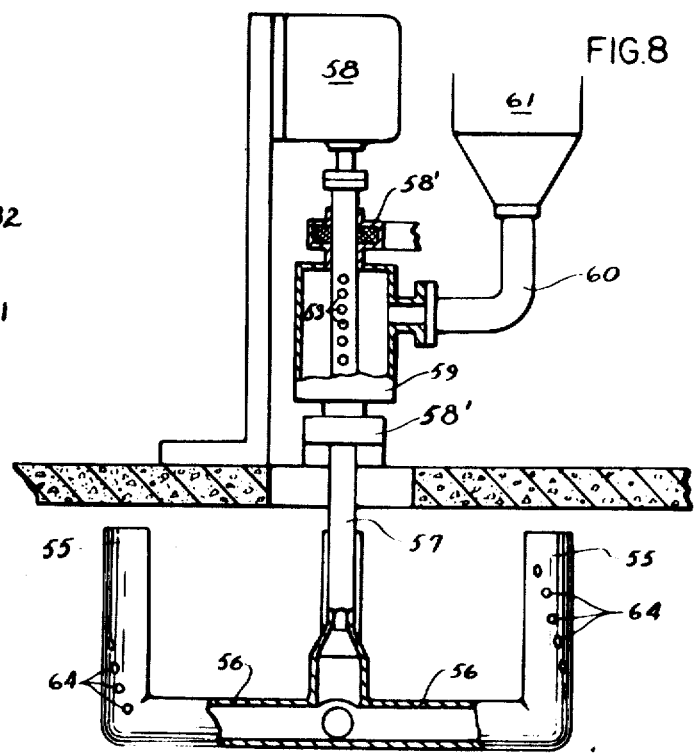

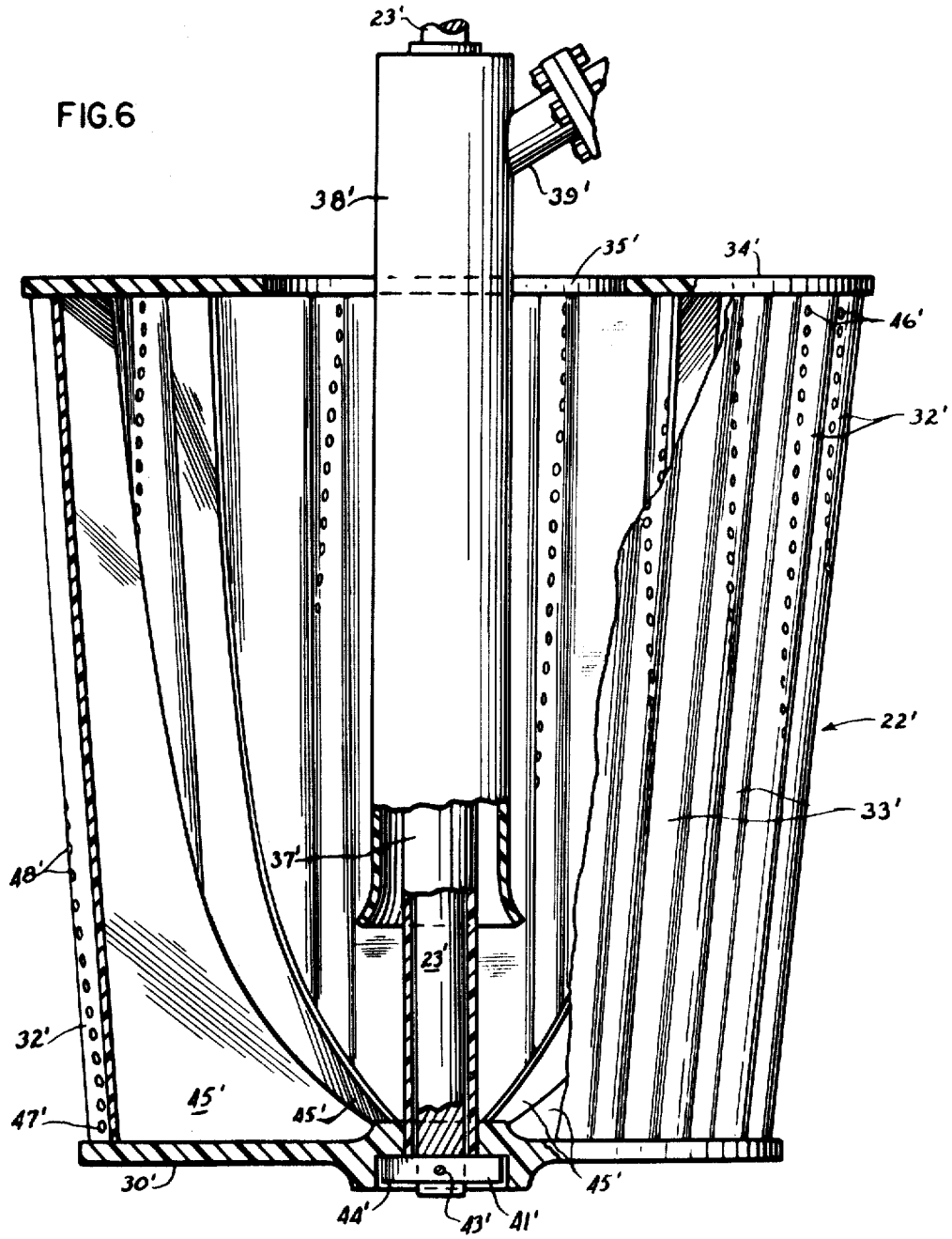

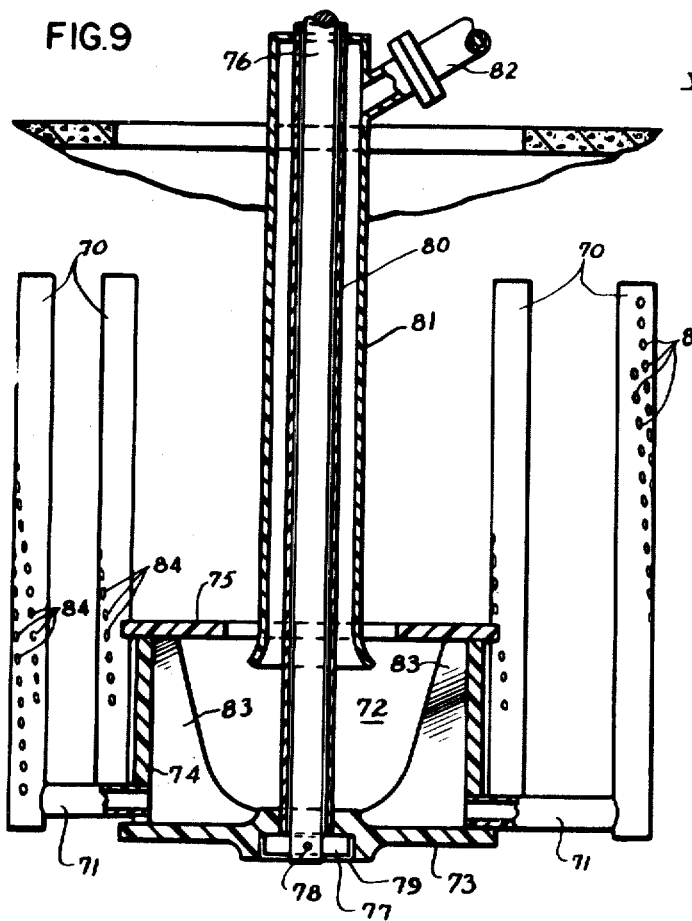
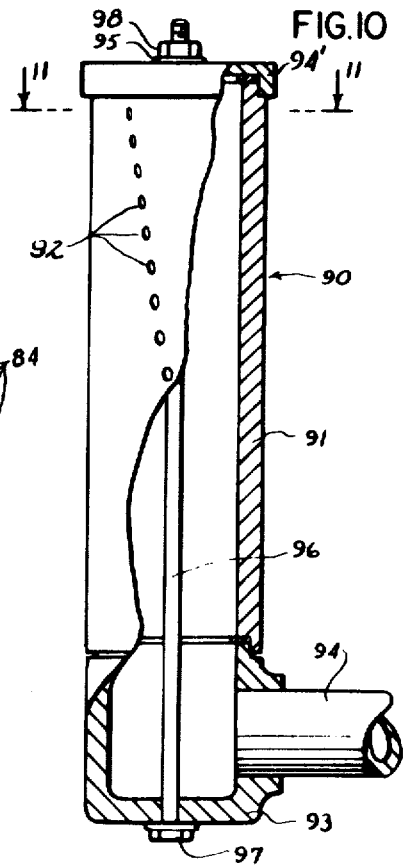
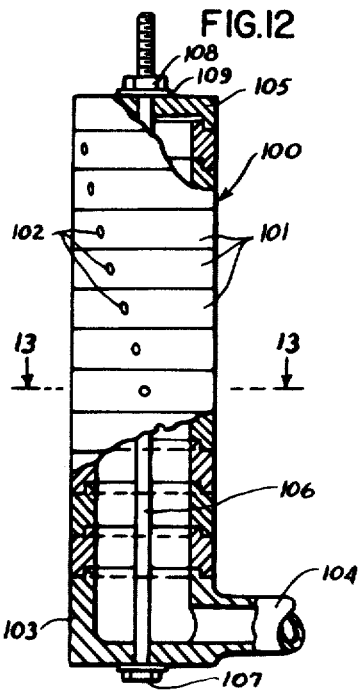
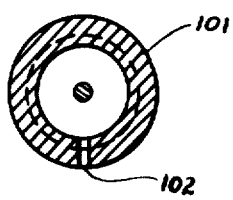
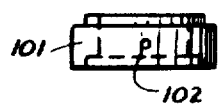
INVENTOR.
MALCOLM H. TUTTLE
BY Ralph M. Watson
His Attorney

METHOD OF PRILLING

RELATED APPLICATION

This application is a division of my pending application, Ser. No. 531,658, filed Mar. 4, 1966, now U.S. Pat. No. 3,461,489.

BACKGROUND OF THE INVENTION

Prills are formed in a prilling tower, which is generally cylindrical in form, by expelling a molten material from a distributor through a series of holes to form drops of desired size. Those drops, which should be uniformly distributed across the area of the tower, fall through a current of air that cools and solidifies them and the solidified drops are then collected at the bottom of the tower in the form of generally spherical prills which are intended to pass through screens of specific mesh sizes.

In the past, two broad types of prilling apparatus have been used. The first of these is known as the "static shower-head" type and the second is known as the "centrifugal bucket" type. Neither of these types of prilling apparatus has proved to be satisfactory in use:

The static shower head-type of prilling apparatus would appear to afford separate control over drop size and distribution since drop size would seem to be governed by the size of the holes in the "head" and the pressure on the heads, while the size, number and location of heads would seem to govern distribution. However, in actual use, this has no been borne out and this type of installation has been beset by numerous problems. The prills produced thereby vary widely in size and a large percentage of broken prills is produced resulting in the creation of dust, which is a loss, and a product which compacts and is hygroscopic. The major causes of the big variation in the size of the prills produced through the static shower head-type of prilling apparatus are (1) dirty shower heads, (2) collisions between drops from adjacent heads, and (3) the impossibility of maintaining uniform melt pressure in all heads.

1. Dirty shower heads result from the accumulation of foreign matter because of the difficulty of determining, during operation, which holes are obstructed. It is also difficult to remove and replace a shower head which is in operation.

2. Collisions between drops often cause drops to coalesce to form drops of such size that solidification is not completed before the drops strike the bottom of the tower and break by impact, causing coagulation of good prills and a buildup on the bottom. Collisions between drops also cause splatter and the formation of undersized prills and dust. Higher towers have been used in an attempt to cool the oversize prills but this also increases breakage of solidified prills because of higher impact. Dedusting equipment has been installed to eliminate dust from the product. These attempted solutions have added to the cost of the equipment and to the operation and have not solved the problem of the formation of dust and off-sized prills.

3. The desireable feature of uniform distribution is approached with the shower head-type spray by providing numerous heads spaced so as to give a good distribution pattern. This requires manifolding of the heads in such a way as to maintain equal pressure in the heads. When there is a difference or variation in pressure, both the size and spread (distribution) of the drops are affected. In actual plant operation, lack of uniform pressure is a common cause of over and undersized prill production.

Since specifications normally control the size of marketable prills, prills not meeting the specification can only be recovered by remelting and recycling. This not only adds to the cost of operation but often results in an inferior product.

The inability of the static shower head-type of prilling apparatus to provide independent control of size and distribution of the drops delivered thereby has resulted in the general adoption of a centrifugal bucket type of prilling apparatus wherein prill size has been effected by factors which control distribution. In this centrifugal type of apparatus, as used in the past, the distributor is bucket-shaped and is rotated by a central shaft attached to the bottom of the bucket. Holes are drilled in the sidewall of the bucket and melt added to the bucket is discharged radially by centrifugal force. As jets of melt leave the holes, the velocity of a jet with respect to the tower is the resultant of the velocity of the jet with respect to the bucket and the velocity of the periphery of the bucket with respect to the tower. When the diameter of a bucket is made the same at the top and the bottom, the peripheral velocity of holes at the top and bottom would be the same but, on account of the difference in height, the centrifugal force at the bottom would be greater than the force at the top so the velocity of the jets leaving the holes would be greater at the bottom than at the top, causing a longer travel from the bottom than from the top. This would result not only in bad distribution but upper streams of melt would cross the paths of lower streams and cause collisions to produce off-size prills. To avoid cross stream flow, it was customary to make the bottom of the bucket with a smaller diameter than the diameter of the top. When the difference in diameters caused a slope of the bucket side to exceed about 11°, melt would wet the outside of the bucket and by centrifugal force travel up the outside to the top edge where it would be thrown off as a mist, or, with greater angles, as a sheet, to form dust and particles not suitable for the finished product.

A very serious disadvantage of the sloping sided bucket as used in the past is that drops are formed under one set of conditions of peripheral and centrifugal forces at the top and widely different conditions at the bottom. It is known that high peripheral velocities tend to produce smaller sized drops but with peripheral velocities above about 15 feet per second, an increase in the hole size tends to cause the jet to break into drops of all sizes. High peripheral velocities are required at the top of the conventional sloping sided bucket in order to distribute prills to the walls of the prilling tower but low velocities are needed to distribute prills toward the center of the tower. Because of the limitation on the useful slope of the bucket, it was not possible to distribute over an area greater than about 70 percent of the tower area, and this required employment of velocities which cause wide variation in prill size.

SUMMARY OF THE INVENTION

I have discovered that it is possible to overcome the disadvantages, referred to above, that have been inherent in the use of the static shower head-type of prilling apparatus and in the past centrifugal bucket type of prilling apparatus by expelling the melt from a rotating centrifugal distributor in jets that are caused to travel at different but related velocities with respect to the prilling tower, and that this may be accomplished through adjustment of the angles at which the respective jets of melt leave the rotating distributor:

I have found that, when melt is discharged from a vertical axis rotating centrifugal distributor, advantage can be taken of the fact that the force with which it is discharge and the distance of its horizontal travel in the prilling tower are dependent upon the resultant of its combined jet and peripheral velocities; and this resultant velocity is, in turn, a function of the direction in which the melt is discharged from the rotating distributor. When a jet of melt is from a conventional bucket-type distributor, the angle formed by the line along which it emerges and the tangent, at the point of emergence, to the circle described by the wall of the bucket as it rotates (which I shall refer to herein as the angle of discharge) is a right angle. When the jet is discharged along a line that is directed toward the direction of rotation of the distributor, so that the size of the angle of discharge is decreased, the resultant velocity of the jet is correspondingly increased. Conversely, when the jet is discharged along a line that is directed away from the direction of rotation of the distributor, so that the size of the angle of discharge is increased the resultant velocity of the jet is correspondingly decreased. Accordingly, in the practice of my invention, the drops that are to be solidified into prills are formed by expelling the melt through holes extending through the wall of a centrifugal distributor along lines located at spaced horizontal planes and the sets of drops expelled from the holes along the respective planes are distributed over related sets of adjacent concentric annular areas by progressively decreasing the travel velocities of the respective sets through variations in the magnitude of the angles of discharge of melt from the distributor, from a minimum for the set of drops from the highest plane to a maximum for the set of drops from the lowest plane. As a consequence, the prills that I produce are of more uniform size than those that have been made in the past, buildup in the prilling tower is reduced, and, during their formation, my prills are uniformly distributed over the total cross-sectional area of the prilling tower.

BRIEF DESCRIPTION OF THE DRAWING

Apparatus well adapted for use in the practice of the method that I have invented, in the form that I now prefer, is illustrated diagrammatically in the accompanying drawing in which:

FIG. 3 is a vertical section, on an enlarged scale, of the centrifugal distributor illustrated in FIG. 1;

FIG. 4 is a fragmentary view along the lines 4—4 of FIG. 3;

FIG. 5 is a fragmentary view along the lines 5—5 of FIG. 3;

FIG. 6 is a vertical section illustrating a modification of the distributor illustrated in FIG. 3;

FIG. 7 is an enlarged front elevation of a modified form of arcuate section of the type included in distributors illustrated in FIGS. 3, 5 and 6;

FIG. 8 is an elevation, broken away in part, of a modified type of distributor;

FIG. 9 is a vertical section of a further modification of a distributor embodying my invention;

FIG. 10 is an elevation, broken away in part, of an adjustable distributor head embodying my invention;

FIG. 11 is a section along the lines 11—11 of FIG. 10;

FIG. 12 is an elevation, broken away in part, of a further modification of an adjustable distributor head embodying my invention;

FIG. 13 is a section along the lines 12—12 of FIG. 12; and

FIG. 14 is an elevation of one of the distributing elements in the modification illustrated in FIG. 12.

DETAILED DESCRIPTION OF THE PREFERRED EMBODIMENT

Figure 1:
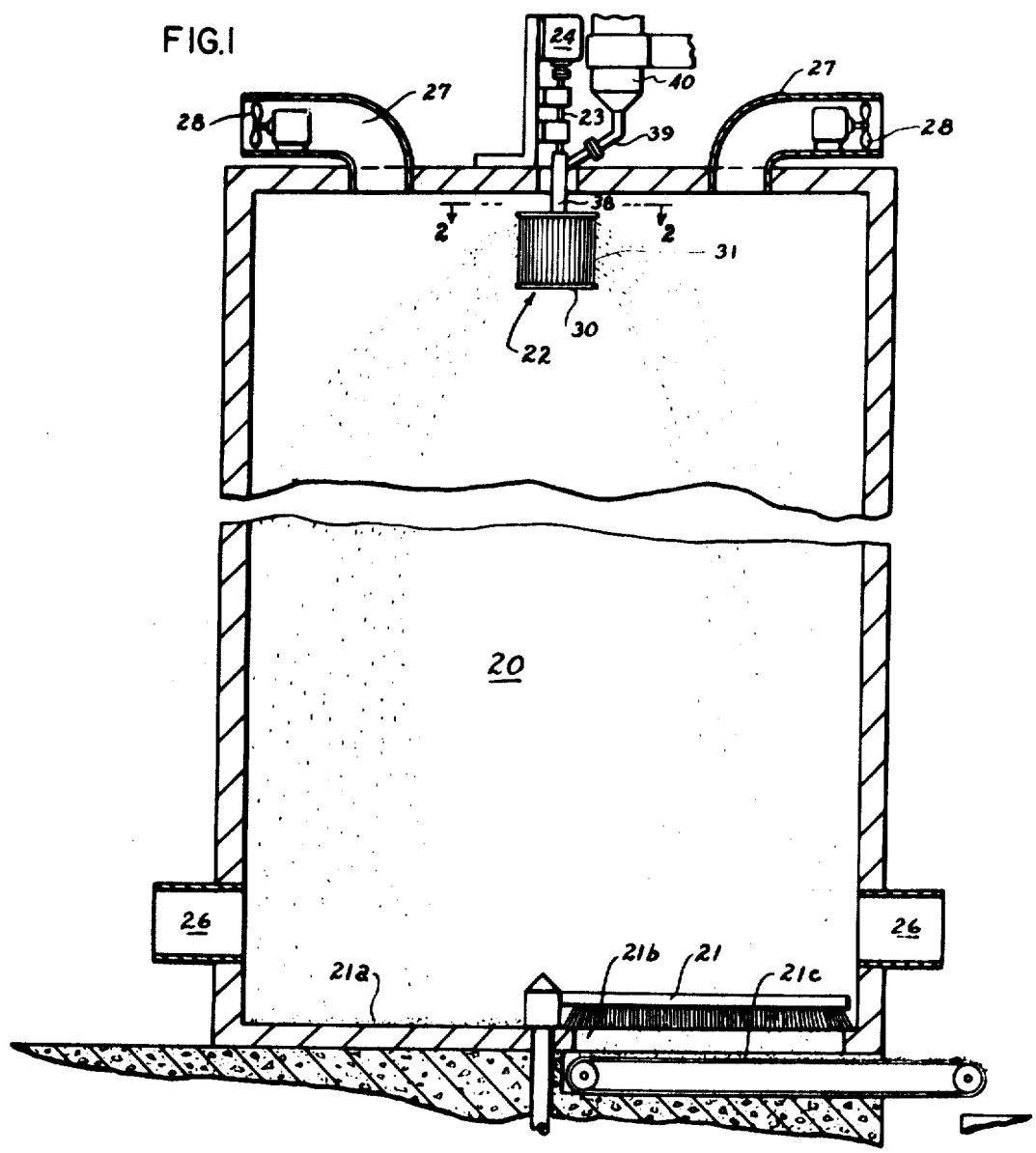
FIG. 1 is a vertical section of prilling apparatus embodying my invention.
Figure 2:
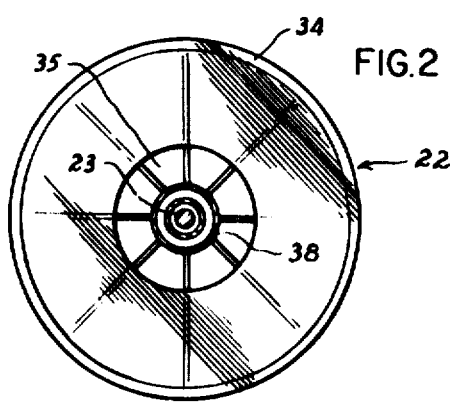
FIG. 2 is a plan view, on an enlarged scale, along the lines 2—2 of FIG. 1.

The prilling apparatus illustrated in FIG. 1 includes a cylindrical tower 20 having a prill collector at its lower end which includes: a scraper 21 mounted for rotary movement and adapted to scrape prills falling on the floor 21a through an opening 21b to a horizontal conveyor 21c. A centrifugal distributor 22 is suspended on shaft 23 adjacent the upper end of tower 20 and is rotated with shaft 23 by means of motor 24. Passages 26 admit air at a temperature below the melting point of the prilled melt to tower 20 adjacent its lower end and air is exhausted from tower 20 through passages 27 by means of blowers 28.

The centrifugal distributor 22 illustrated in FIGS. 1–5 is in the form of a bucket and includes a bottom plate 30, which supports corrugated generally cylindrical sidewall 31 having semicircular ridges 32 and corrugations 33 and a top plate 34, having opening 35 therein, is fixed to sidewall 31. An axial tube 37, which supports feed tube 38, extends through opening 35 and is fixed to the bottom plate 30 so that it may surround shaft 23. A conduit 39 connects the melt hopper 40 with the interior of feed tube 38. The shaft 23 has a key 41 pivotably mounted in the slot 42 at its lower end by means of pin 43. They key is adapted to fit in keyway 44 in the bottom of plate 30 to support distributor 22 and to rotate that distributor with shaft 23. The distributor 22 can be removed from shaft 23 by raising it to a point where the key 41 can be pivoted to a position in which it is parallel with shaft 23 and the distributor may then be permitted to drop off the shaft. Vanes 45 are fixed to the inner surface of wall 31 for the purpose of causing melt fed to the interior of distributor 22 to rotate therewith and at the same speed.

An upper hole 46, a lower hole 47 and intermediate holes 48 are formed in each of the semicircular ridges 32. These holes are disposed along a helical path which connects hole 48, located at the lower trailing edge of its ridge 32 when the distributor 22 is rotated, with hole 46, located at the upper leading edge of its ridge 32 when distributor 22 is rotated. Each of holes 46, 47 and 48 extends through the portion of the wall forming its semicircular ridge 32 along a radius of that ridge.

The centrifugal distributor 22' illustrated in FIG. 6 is also in the form of a bucket. The bottom plate 30' supports corrugated sidewall 31' which, for purposes that will be described hereinafter, tapers inwardly from its top to its bottom and has semicircular ridges 31' and corrugations 33'. A top plate 34' having an opening 35' therein is mounted on sidewall 31'. Axial tube 37', which supports feed tube 38', extends through opening 35' and is fixed to the bottom plate 30' so that it may surround shaft 23'. Conduit 39' connects a melt hopper with the interior of feed tube 38'. Shaft 23' has a key 41' pivotably mounted in slot 42' at its lower end by means of pin 43'. The key 41' is adapted to fit in keyway 44' to support and rotate distributor 22' with shaft 23'. Vanes 45' are fixed to the inner surface of wall 31' to cause melt in distributor 22' to rotate with, and at the same speed as, distributor 22'.

Each of the semicircular ridges 32' has a series of radial holes including upper hole 46', lower hole 47' and intermediate holes 48' which are disposed along a path connecting those holes. Hole 47' is located at the lower trailing edge of ridge 32' when distributor 22' is rotated, while hole 46' is located at the upper leading edge of that ridge and the intermediate holes 48' occupy intermediate positions along that ridge.

The ridges 32 of centrifugal distributor 22 (and the ridges 32' of centrifugal distributor 22') can be replaced by ridges 49 of the type illustrated in FIG. 7 which contain, in addition to the row of angularly related radial holes 50, subsidiary rows of radial holes 51 and 52 that are also angularly related to each other, when it is desired to increase the number of holes of a given diameter that are employed beyond the number of holes of a given diameter that are employed beyond the number that may be accommodated in a single row.

A rotating arm type of centrifugal distributor is illustrated in FIG. 8 wherein tubes 55 are mounted on hollow arms 56 so that the axes to tubes 55 are vertical and parallel to the axis of hollow shaft 57 which is rotated by variable speed motor 58. Shaft 57 is supported and guided by stuffing box bearings 58 which form the ends of a housing 59. A conduit 60 connects a melt feed hopper 61, which is provided with a suitable heating element (not shown) with housing 59. Between stuffing box bearings 58 and within housing 59 the hollow shaft 57 is drilled radially to provide passageways 63 from housing 59 to the interior of shaft 57. A series of horizontally spaced radial holes 64 is drilled in each of tubes 55 and those holes are positioned with respect to the direction of rotation of shaft 57 to provide the angles of discharge for the melt that will insure uniform distribution of the drops of melt expelled through holes 4.

A modified rotating arm type of centrifugal distributor that may be employed for the prilling of heat-sensitive substances where it is desirable to hold the melt at high temperature for the shortest possible time is illustrated in FIG. 9. It includes a series of tubes 70 connected through hollow arms 71, with box 72 which is constructed of a bottom plate 73, a generally cylindrical sidewall 74 and a top plate 75. The box 72 is suspended from drive shaft 76 to rotate therewith by means of key 77 pivoted to the shaft at 78 and adapted to occupy the keyway 79 in bottom plate 73. An axial tube 80, which surrounds shaft 76, is fixed to bottom plate 73 and supports feed tube 81. A conduit 82, which communicates with the interior of feed tube 81, leads to a melt feed hopper (not shown). Vanes 83 are provided in box 72 to cause melt fed to the interior of that box to rotate therewith and at the same speed. Each of tubes 70 is provided with radial holes 84 through which the melt is expelled. Those holes are positioned with respect to the direction of rotation of shaft 76 to provide the angles of discharge for the melt that will insure the desired uniform drop distribution of the melt expelled through them.

In the rotating arm type of centrifugal distributor, the vertical tubes from which the melt is discharged can be constructed so that the angles of discharge can be changed. This may be accomplished by substituting for the continuous tubes 55 illustrated in FIG. 8 (or the continuous tubes 70 illustrated in FIG. 9) a demountable tube such as that illustrated in FIGS. 10-11, or a composite tube such as that illustrated in FIGS. 12-14.

The tube 90 illustrated in FIGS. 10 and 11 consists of a cylinder 91 having a row of angularly related radial holes 92. The cylinder 91 is mounted on a boss 93 carried by hollow arm 94 so that it can be adjustably rotated on the boss. The cylinder 91 is provided with a cap piece 94 that is engaged by washer 95. A bolt 96, whose head 97 engages the bottom of boss 93, extends upward through the cylinder 91 and the cap piece 94 along the axis of tube 90. A nut 98 on the threaded upper end of bolt 96 can be tightened to lock cylinder 91 into the position on boss 93 where disposition of holes 92, with respect to the direction of rotation of the centrifugal distributor equipped with tube 90, is best adapted to provide the angles of discharge for melt expelled through those holes that will insure the desired uniform drop distribution of that melt.

The composite tube 100 illustrated in FIGS. 12-14 is made of a series of mating annuli 101 adapted to be nested together as illustrated in FIG. 12. Each annulus 101 is provided with a radial hole 102. A stack of nested annuli 101 is mounted on boss 103 which is fixed on the of hollow arm 104 and the tube formed thereby is closed at its upper end by cap piece 105. The stack of annuli 101 is assembled so that the respective radial holes 102 are in the positions, with respect to the direction of rotation of the centrifugal distributor equipped with arm 104, that are best adapted to provide the angles of discharge for melt expelled through them that will insure the desired uniform drop distribution of that melt. The annuli 101 and their cap piece 105 are locked in assembled position by means of bolt 106 whose head 107 engages the lower face of boss 103 and whose upper end is threaded to receive nut 108 that forces washer 109 against the top of cap piece 105.

The operation of the apparatus which I have invented will now be described and, in connection therewith, it should be noted that details in the design of the apparatus employed will vary with variations in operating conditions. For instance, the size, number and dispositions of the exit holes in my centrifugal distributor will be governed by factors such as the qualities of the melt being processed, the size of the prills to be produced therefrom, the rate at which the prilling is to be carried out and the dimensions of the prilling tower. Hence, the jet and peripheral velocities and hole diameter which are best suited for the size prill to be produced are first established. Having established said values, and referring to apparatus of the type illustrated in FIGS. 1-5 by way of example, the shaft 23 is brought to the desired rotational speed by motor 24. Melt is fed from hopper 40 to the interior of feed tube 38 through conduit 39 and it flows to the bottom of distributor 22 where it contacts bottom plate 30 and vanes 45 which bring the melt up to the rotational speed of the distributor. Under the effect of centrifugal force the melt rises along the inner surface of the wall 31 to cover the exit holes 47, 48 and 46 through which the melt is discharged at a velocity dependent upon the rotational speed of the distributor and the thickness of the melt layer therein.

When the jet velocity from the bottom holes 47 is made equal to the peripheral velocity and is directed in an opposite direction to the direction of rotation, the resultant velocity with respect to the tower is zero and the jet breaks into drops which fall to the center of the collecting surface of the tower. The centrifugal force acting on the upper holes 46 is not quite as great as the centrifugal force at the bottom holes 47 but as the upper holes 46 face in the direction of rotation, so that they have a smaller angle of discharge, the resultant velocity, which is the sum of the peripheral and jet velocities, causes a horizontal travel of these drops, while falling, across the full radius of the tower. It may not be necessary to face the top holes completely in the direction of rotation to cause sufficient travel to reach the tower wall. To prevent impingement on the wall without reducing jet or peripheral velocities, the top holes 46 may, in some cases, be turned outward or even slightly backward to give a resultant horizontal velocity sufficient to cause prills to move to the outer edge of the collecting area. The drops from the intermediate holes 48 travel through horizontal distances ranging from the minimum for the drops from holes 47 to the maximum for the drops from holes 46. As the drops fall to the bottom of tower 20, they are cooled and solidified into spherical prills by a current of air admitted to the interior of tower 20 through inlets 26, and exhausted therefrom by blowers 28.

The modifications of my new prilling apparatus that are illustrated in FIG. 6, FIG. 8 and FIG. 9, respectively, operate upon similar principles. But, as one of these configurations may meet a special set of operating conditions better than the others, the particular configuration to be chosen for a particular use should be governed by the conditions encountered therein. For instance, the distributor having a vertical sidewall of the type illustrated in FIGS. 1-5 has proved to be superior where it may be operated constantly at or near design conditions. However, where the operation is subject to changes in feed rate at frequent and short intervals, a distributor with a tapered side such as that illustrated in FIG. 6 is preferred. This is illustrated by the results produced through comparable runs in the prilling of urea:

1. A distributor of the type illustrated in FIGS. 1-5, wherein the sidewall had a uniform diameter of 10 inches and a height of 10 inches, distributed prills over 99 percent of the cross-sectional area of a prilling tower 44 feet in diameter when operated at 400 r.p.m. and with a feed rate of 220 tons of molten urea per day. However, when the feed rate was reduced to 134 tons per day (61 percent of design rate), the prills were distributed over only about 58 percent of the tower area, resulting in an increase in the weight of prills deposited per square foot of area covered.

2. Under similar conditions, a tapered distributor of the type illustrated in FIG. 6, having an upper diameter of 10 inches, a lower diameter of 9 inches and a height of 10 inches, when operated at 400 r.p.m. distributed prills over 98 percent of the tower area at a feed rate of 220 tons of molten urea per day, whereas, when the feed rate was reduced to 134 tons per day, the area covered by prills was 60 percent of the tower area, the weight of prills deposited per square foot of area covered was approximately the same as the rate of 220 tons per day, and cooling was not impaired. With a further increase in the taper of this distributor, obtained by reducing the lower diameter to 8 inches, the tower areas covered were: (a) at the rate of 220 tons per day, 97 percent; and (b) at the rate of 132 tons per day (68 percent of design rate), 67 percent, resulting in a reduction in the prills deposited per square foot of covered area as the feed rate is reduced; and cooling was improved over operation at the design rate. In each of these runs, the results were superior by far to the results produced in comparable runs wherein the best available prior art distributor was operated under like conditions.

The terms that I have used in describing the illustrative embodiment of my invention that is illustrated in the accompanying drawing are terms of description and not of limitation. It will be appreciated that changes can be made in the preferred embodiment of my invention that I have described without departing from the spirit of my invention as it is defined in the appended claims.

I claim:

1. The method of prilling through feeding a molten substance from a centrifugal distributor rotating about a vertical axis by expelling said substance through a plurality of series of holes helically disposed along an arcuate segment of a cylinder whose radius is smaller than the radius of the circle described by a point on the distributor wall as it rotates, said holes extending through the wall of the distributor along lines located at spaced horizontal planes to form sets of drops, and then solidifying said drops by causing them to fall to the collector through a current of air whose temperature is below the melting point of said substance, wherein:

the sets of drops expelled from the holes along the respective planes are distributed over related sets of adjacent concentric annular areas by progressively decreasing the travel velocities of the respective sets from a maximum for the set of drops from the highest plane to a minimum for the set of drops from the lowest plane, through variations in magnitudes of the angles of discharge of the melt from the distributor.

2. A method according to claim 1 wherein said holes are disposed with each series located along a line extending from a point adjacent the lower edge of said wall to a point adjacent the upper edge of said wall.

3. A method according to claim 1 wherein the velocities at which the respective sets of drops travel are varied by expelling the drops of each horizontal set along a line whose angular relation to the direction of rotation of the distributor differs from that of each of the lines upon which the other sets of horizontal drops travel.

4. A method according to claim 3 wherein said angular relation increases progressively in size from the highest to the lowest of said planes.